United States Patent Office 3,446,689
Patented May 27, 1969

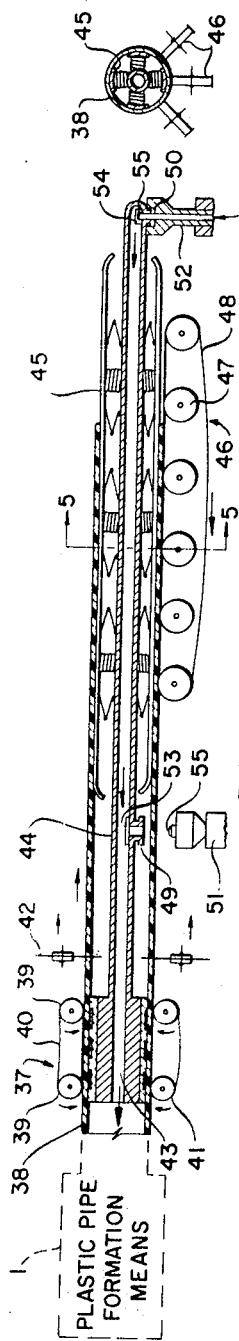
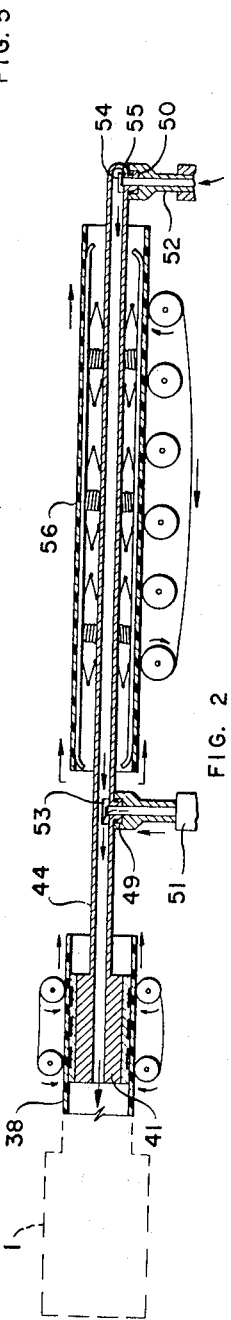
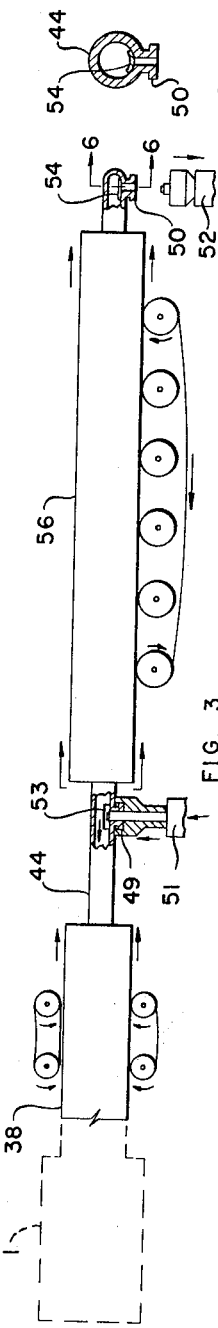
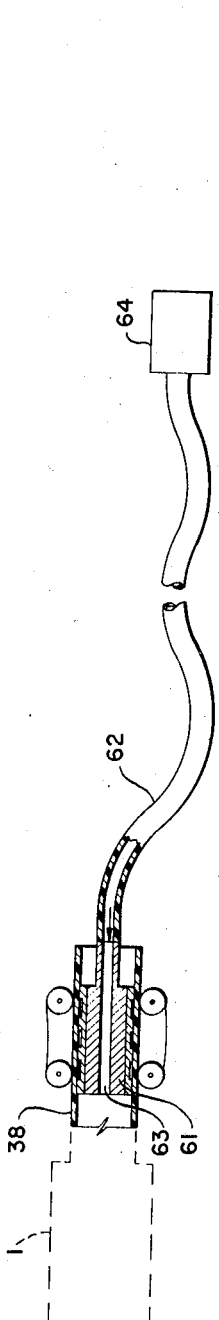
INVENTORS:
FREDERIK W. STORM VAN LEEUWEN
JAN C. VAN DIJK
JOHAN C. HOOGEVEEN
BY: *Joseph W. Brown*
THEIR AGENT

3,446,689
APPARATUS FOR THE MANUFACTURE OF PLASTIC PIPES
Frederik W. Storm van Leeuwen, Jan C. van Dijk, and Johan C. Hoogeveen, Delft, Netherlands, assignors to Shell Oil Company, New York, N.Y., a corporation of Delaware
Filed Dec. 9, 1964, Ser. No. 417,053
Claims priority, application Netherlands, Dec. 23, 1963, 302,457
Int. Cl. B65h 81/00; B65c 3/26
U.S. Cl. 156—432      3 Claims

ABSTRACT OF THE DISCLOSURE

Reinforced plastic pipes are continuously manufactured without the aid of a mandrel by inflating a tubular plastic film with air and applying alternate layers of helically wound and axially oriented resin-impregnated glass fibers.

---

This invention relates to a method and apparatus for the manufacture of plastic pipes, More particularly, the invention provides a method and apparatus for the manufacture of glass-reinforced resin pipes.

In certain cases it is desirable to have available plastic pipes provided with an inner coating or lining. The lining may, for example, serve as a waterproof layer if the pipe itself is not waterproof, or as a smooth coating for reducing the flow-resistance in the pipe or for preventing depositions in the pipe if the latter itself has a rough inner wall. Alternatively, such a lining may serve to protect the pipe against corrosion by the liquid to be transported through the pipe.

Generally, the manufacture of such plastic pipes is effected by forming said pipes or tubes around a core or mandrel of steel or other metal. In this manufacturing technique it is the practice to use a fixedly mounted mandrel, from which the pipe must be removed after it has been formed. Since the pipe tends to stick to the mandrel, removal is often attended with difficulties or even damage, and the surface of the mandrel must, before each pipe is formed, be coated with an agent which prevents adhesion of the pipe.

Many of these shortcomings were obviated by the process disclosed in the United States copending application by Frederik W. Storm van Leeuwen, Ser. No. 341,933, filed Feb. 3, 1964. The method disclosed therein, fundamentally comprises moving a tubular film vertically upwards, during which movement said tubular film is closed at a fixed point relative to the surroundings and filled above that point over at least a part of the path to be traversed by the tubular film with a non-cohesive weighting material, and applying a plastic material, with or without glass-reinforcing fibers, to the outside of the filled portion of the tubular film in such a way that a tubular pipe is formed around said film. While this method remedied many of the difficulties attended the mandrel manufacturing technique, such a method is limited to the manufacture of plastic pipes wherein the tubular film is moved substantially vertically upward. The present method and apparatus is an improvement thereover in that the plastic pipe cannot only be produced in a vertical direction but can be produced in a horizontal direction as well as in oblique directions therebetween.

It is therefore a primary object of the present invention to provide a simple method for the manufacture of reinforced plastic pipes provided with a thin-walled lining wherein the employment of a core or mandrel is obviated. It is another object of the present invention to provide a method for the continuous and rapid manufacture of plastic pipes, particularly glass-reinforced plastic pipes having an inner coating or lining and wherein the inner tubular lining may be moved during the pipe fabrication in any direction, viz, either vertically, horizontally, or obliquely.

Still other objects will become apparent to those skilled in the art from the following disclosure and accompanying drawings.

The apparatus according to the invention is characterized in that it is provided with a fixedly mounted piston connected to an air-supply pipe and having a bore in communication with the air-supply pipe for the supply of air from this pipe into the tube, over which piston and air-supply pipe the pipe formed by the tube and the coating may pass during production. The air-supply pipe is preferably provided with connections for disconnectably connecting an air-supply line, which connections are arranged on the air-supply pipe at a distance from each other greater than on length of the pipe to be produced.

Apart from the fact that the present method and apparatus are particularly suitable for manufacturing the pipe in a horizontal position, which in general simplifies the production and the required apparatus, the invention has the advantage, when used in the vertical position, that, owing to the low specific gravity of air, the load on the filled portion of the inner weak tube is the same over the entire length thereof, so that the tube assumes a truly cylindrical shape.

Since the tube once it has been coated may no longer be pinched for closing the filled part of the tube, special measures are necessary to retain the filling air in the inner weak tube, or alternatively to supply air to the tube portion as this portion grows longer during the production, or to compensate losses due to the escape of air from the tube. In the latter two cases it is necessary to continuously supply supplementary air to the tube during the production. To close the pipe and to supply supplementary air, a plug having a small bore may be placed in the leading end of the tube so as to travel with the tube, the bore of the plug being in communication with a long flexible air-supply line. By using a sufficiently long air supply line very long pipes may be produced in this way. After a pipe of the desired length has been formed this length of pipe may be cut off from the rest of the pipe and the plug can be inserted in the new leading end of the pipe. Shorter lengths of pipe may be continuously produced by supplying air to the weak tube through a bore in a piston placed in the leading end of the pipe immovably relative to the surroundings, the said bore being in communication with an air-supply line.

In some cases the manufacture of the pipe may advantageously be combined with the production of the weak tube by extrusion. The extrusion head then acts as closing device for locally closing the extruded tube of film, while at the same time air may be supplied through an air conduit in the mandrel of the extrusion head, as is conventional in extruders which are used in the film-blowing process.

The leading end (forward end) of the tube may then be closed by a piston secured to the mandrel of the extrusion head at the desired distance from the head, so that the piston invariably remains in the same place relative to the extrusion head.

If the pipe is produced in the vertical position the upper end of the pipe may be closed simply by placing a free piston in the tube, which piston remains in substantially the same place relative to the surroundings when the tube moves in the upward direction, thereby locking the air in the portion of the tube below the piston, the weight of the piston compressing this air. If the sealing between piston and tube-wall is satisfactory, no air will escape from the tube. This method may, however, also be used when some slight leakage occurs, since any loss of air is compensated by a slight downward displacement of the piston in the tube, the air-pressure in the tube remaining unchanged.

The desired air-pressure in the tube depends, inter alia, on the diameter of the tube and may, for example, vary from 0.1 kg./sq. cm. in the case of tubes having a diameter of 30 cm., to 0.5 kg./sq. cm. in the case of tubes having a diameter of 2½ cm. However, the pressure exerted on the tube by applying a coating thereon, the wall-thickness of the weak tube, the mechanical properties, such as, for example, the tensile strength and the elasticity of the tube material must also be taken into consideration when determining the desired air-pressure. In general, the pressure exerted by the air on the tube should be of such magnitude that the filled portion of the tube forms a circular cylinder which can withstand the forces exerted upon it during the coating process without undergoing any substantial change in shape.

According to a variant of the invention a slight subatmospheric pressure is maintained on the outside of the tube and the filling air in the tube is at atmospheric pressure, for example, by passing the tube through a sealing ring in the wall of a room in which the pressure is below the atmospheric pressure into a room at normal atmospheric pressure. In the room at atmospheric pressure the produced pipe may be cut into separate lengths of pipe without it being necessary to interrupt the production.

The weak tube may be of any suitable material, such as plastic, paper, fabric, cellophane, rubber, etc. The material may be slightly permeable to air. The coating layer preferably comprises a thermosetting resin, preferably an epoxy resin, which, as such or reinforced with, for example, glass fibers, is laid around the tube.

The liquid resins which are suitable for use in the present method include, among others, polyester, polyether, polyepoxy, polyurethane, phenolaldehyde, urea-formaldehyde, melamine-formaldehyde resins and mixtures thereof. Suitable polyester resins (alkyd) are described in "The Chemistry of Synthetic Resins," Carleton Ellis, Chapters 42–49, Reinhold Publishing Company (1935). The preparation of operable polyether and polyepoxy resins are described in "Epoxy Resins," Lee and Neville, McGraw-Hill Book Company (1957) and in U.S. Patent No. 2,633,458, issued Mar. 31, 1953, to Shokal. The preparation and properties of suitable phenol aldehyde and urea-formaldehyde resins can be found in "The Chemistry of Synthetic Resins," Chapters 13–32. Information on suitable polyurethanes can be found in "Polyurethanes, Chemistry and Technology," Saunders and Frisch, John Wiley and Sons (1962).

Curing agents which are suitable for use in the present invention are, in general, discussed in the above-noted sources in conjunction with the respective resins.

It was found that the present method is particularly suitable for preparing reinforced plastic pipe when glass roving fibers are impregnated with an impregnating fluid comprising a polyepoxide resin (Polyether A of Shokal, U.S. Patent No. 2,633,458, issued Mar. 31, 1953) and an aliphatic amine such as diethylene triamine. Other suitable polyepoxide curing agents include carboxylic acids, carboxylic acid anhydrides and mixtures thereof. Related runs were made with othed resins, including polyurethanes, phenolformaldehyde and alkyd resins. In every instance, suitable glass-reinforced resin pipes were continually produced.

The expression "weak tube" in the present disclosure and description is meant a tube having such a small wall-thickness that, at least when coated, it cannot, without support, maintain a circle-cylindrical shape.

The invention also relates to a pipe produced according to this method.

By way of example, the invention will now be described with reference to the accompanying drawings, wherein:

FIGURES 1 to 3 show the apparatus during various successive steps in the production of plastic pipes according to the invention wherein:

FIGURE 1 is a longitudinal view in part cross-section of the apparatus at a time when the formed plastic pipe is being cut into sections of predetermined lengths in which only the forward air supply means is engaged.

FIGURE 2 is a longitudinal view in part cross-section of the apparatus immediately after the rearward end of the severed pipe section has passed the rearward air supply line connection and in which both air supply means are coupled.

FIGURE 3 is a longitudinal view in part cross-section of the apparatus immediately after the position of FIGURE 2 in which only the rearward air supply line is coupled.

FIGURE 5 is a cross section on line 5—5 of FIGURE 1.

FIGURE 6 is a cross section on line 6—6 of FIGURE 2.

FIGURE 7 is a simplified alternative embodiment for producing long pipe lengths.

Figure 4:
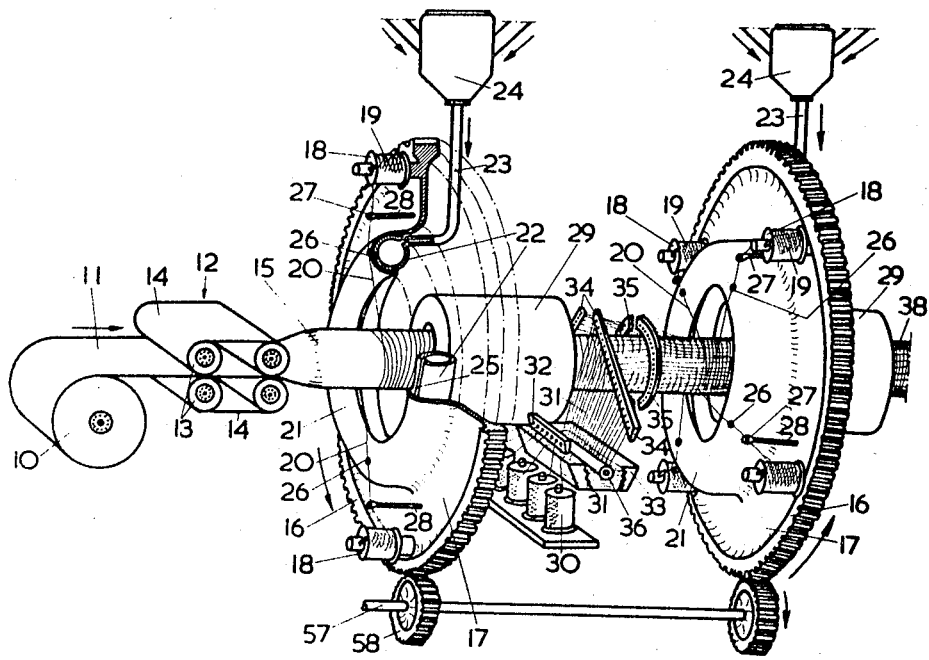
FIGURE 4 is an enlarged detailed perspective view of that portion of the apparatus in which the plastic pipe is formed.

In FIGURE 4, a plastic pipe formation means 1 functions so that a flat and flexible tubular film 11 made, for example, of plasticized polyvinyl chloride, runs from a supply reel 10 to a closing or sealing device 12. The sealing device 12 consists of two sets of rollers 13 situated on either side of the film 11, a short, endless belt 14 passing over each set of rollers 13. The rollers 13 and belts 14 are so mounted that they compress the entire width and a certain length of the film 11, so that the film is locally closed or sealed in an air-tight manner.

Past the sealing device 12, the film 11 has a circular cross-section by having been filled with air, as will be explained later. Thus a circle-cylindrical portion of film 15 is formed which is moved further in a horizontal direction. A pair of discs 17, provided on the periphery with a gear-ring 16, are vertically mounted co-axially with the cylindrical portion of film 15. The discs 17 can be rotated round the tubular film 15 by means of a set of pinions 58 to be driven by a shaft 57 and in engagement with the gear-ring 16. A number of bobbins 18, on which glass fiber thread 19 is wound, are distributed regularly along the periphery of the discs 17. A glass fiber thread 20 runs from the bobbins 18 to the periphery of the tube 15. The discs 17 are provided with an annular elevated portion 21, containing a hollow ring 22 which is rotatable relative to the elevated portion 21. The interior of the ring 22 is in communication via a supply line 23 with a supply vessel 24 containing an impregnation liquid, in this case an epoxy resin. The rings 22, together with the supply lines 23 and the vessels 24 are mounted in a fixed manner relative to the rotatable discs 17. The discs 17 and the rings 22 are continuously pressed against each other by a slight horizontal force applied in any suitable manner not shown here. A circular slot 25 concentric with the ring 22 is arranged in the wall of each ring 22. In the elevated portion 21 of the discs 17, a number of narrow openings 26 are distributed regularly in such a way that each opening 26 is located directly opposite the slot 25 of a ring 22 and, when the discs 17 rotate round the tubular film 15, always remains directly opposite the slot 25. On either side of the slot 25, sealing rings (not shown) are arranged concentric with the slot 25, which sealing-rings, as a result of the small force pressing the discs 17 and the rings 22 towards each other, seal the slot 25 against the inner wall of the elevated portion 21, so that liquid from the interior of the ring 22 can only flow to the outside through the openings 26 in the disc 17. The openings 26 are so dimensioned that the glass fiber thread 20, drawn over the openings 26 under a light tension, seals off these openings. A number of guiding needles 28 mounted on the disc 17 and provided with an eye 27 serve to guide the glass fiber threads 20 over the openings 26.

Further, the glass fiber thread 20 is wound round the surface of the cylindrical tube section 15. An electrical heating element 29 is mounted behind each disc 17.

A number of bobbins 30 with glass fiber thread are also placed between the discs 17. From the bobbins 30, glass fiber threads 31 run through a number of horizontal guides 32, through a number of baths 33 and subsequently through the tilting guides 34 mounted in pairs and through circular guides 35. The threads 31 are distributed by these latter guides 35 round the entire circumference of the tube 15 at mutually equal distances. The baths 33 contain a liquid similar to that in the vessels 24 to at least the level of a roller 36 arranged in each bath 33, the threads 31 are passed under the said roller 36 so that they are wetted with the liquid in the bath 33.

The portion of the apparatus positioned at the right (downstream) of the upstream portion, i.e., plastic pipe formation means 1, shown in FIGURE 4, is shown in FIGURES 1 to 3. FIGURES 1 to 3 show in sequential steps the apparatus of the instant invention. FIGURE 1 shows a hauling device 37 comprising a number of pair of rotatable rollers 39 over which an endless belt 40 is driven which presses against the coated tube or plastic pipe 38, and advances the pipe 38. To the right of the hauling device 37 a cutting device is mounted formed by a number of rotatable disc knives 42 which may be moved round the pipe 38 and also from or to the pipe 38 in a radial direction. If required, the knives 42, while cutting, may be axially displaced with the pipe 38 at the same speed. After cutting, the knives 42 return to the initial position. Inside the pipe 38 is a piston 41 provided with a central bore 43 and in air-tight contact with the wall of the pipe 38. The piston 41 is secured to an air-supply pipe 44 extending internally throughout the rest of the pipe 38. The air pipe 44 is centrally supported in the pipe 38 by a centralizer 45 secured to the air pipe 44. The leading end of the plastic pipe 38 is supported and advanced by a second hauling device 46 which, like the first hauling device 37, is provided with rollers 47 and an endless belt 48. The running velocity of the belt 48 can be adjusted equal to or greater than the speed of the belt 40. The air supply pipe 44 is provided with a pair of connections 49 and 50 for connecting air supply lines 51 and 52 respectively to the air pipe 44. The dimensions of the connections 49 and 50 are such that the pipe 38 may pass over them. In the connections 49 and 50, valves 53 and 54 are mounted which are in the closed position when the air supply lines 51 and 52 are not connected to the connections 49 and 50, and in this position of the valves no communication between the air supply pipe 44 and the space outside the air pipe 44 is possible. In FIGURE 1, the valve 53 is in this closed position. By connecting the air supply line 51 or 52 to the connection 49 and 50, the valve 53 or 54 is opened by a portion 55 projecting from the lines 51 and 52, as shown in the right connection 50 in FIGURE 1. Air may now flow from line 51 or line 52 into the air pipe 44, while the connection to which no air supply line is connected remains closed.

As may be seen from FIGURE 2, the distance between the connections 49 and 50 is greater than the length of the pipe section 56 of the plastic pipe 38.

The air supply lines 51 and 52 may be connected to a compressed air system, small compressor or the like. The individual devices of the apparatus are secured on a frame (not shown).

When the apparatus described is used, the flat, tubular film 11 is drawn from the supply reel 10 through the sealing device 12 and thence moved further at constant speed and in a horizontal direction by the hauling device 37, assisted, if desired, by the hauling device 46, which moves at the same speed.

In a manner to be described in more detail later, air having a slight overpressure, for example, 0.1–0.2 kg./sq. cm., is blown through the bore 43 of the piston 41 into the film tube, so that this tube after having passed the sealing device 12, assumes a cylindrical shape. The air in the cylindrical tube portion 15 fills and supports the tube 15, as a result of which the glass fiber threads 20 and 31 may be laid around the tube 15 without or practically without the tube changing its shape. The threads 20 are wound helically round the tube by rotation of the discs 17 driven by the shaft 51 and the pinions 58, and by the continuous advancement of the tube 15. Before the threads 20 are laid over the tube, they are drawn over the openings 26 in the disc 17 as result of which the threads 20 are impregnated with the epoxy resin discharged from these openings 26, the resin being supplied to these openings 26 from the vessel 24 through the supply line 23, the hollow space in the ring 22 and the slot 25 in the ring 22. In this way a first coating of epoxy resin reinforced with glass fiber is laid on the tube 15. The tube subsequently passes the heating element 29, where the liquid epoxy resin is wholly or partly hardened by heating. Over the first coating on the tube 15 a second coating is then applied consisting of glass fiber threads 31 laid axially on the tube, these threads also having been impregnated with epoxy resin by prior immersion in the bath 33. Finally, while the tube is passing the disc 17 located on the extreme right, a third layer is laid over the second coating of the tube 15 in the same way as the first layer.

The now completely coated tube 15 subsequently passes a second heating element 29 to harden the epoxy resin in the coating. After the tube has passed the second heating element 29 the resin has hardened to at least such an extent that the coated tube 15 constitutes a plastic pipe 38 of sufficient rigidity to retain the cylindrical shape also without the support of the filling air. The pipe 38 is now sufficiently strong to withstand the pressures exerted by the hauling device 37 without bad effects. If so desired the piston 41 may be mounted in the pipe 38 opposite the hauling device 37 to support the inner wall of the pipe 38. After having passed the piston 41 the pipe 38 is no longer supported by the filling medium. The pipe 38 continues to move further until a section of the desired length has passed the knives 42. At this moment the knives 42 are quickly mover around the pipe 38 and radially thereto as a result of which the section of pipe 56 is severed from the pipe 38. If it is desired to obtain a neatly cut edge the knives 42, while cutting, are moved axially with the pipe 38 at the same speed as the pipe 38. As long as the pipe section 56 is still connected to the plastic pipe 38, the peripheral velocities of the belts 40 and 48 of the hauling devices 37 and 46 are equal. As soon as the pipe section 56 is severed from the plastic pipe 38 by the knives 42 the peripheral velocity of the belt 48 of the hauling device 46 is considerably increased so that the pipe section 56 quickly moves away from the slowly moving plastic pipe 38 and finally after having passed the centralizer 45 entirely, is removed from the apparatus.

Throughout the entire process, air is continuously supplied through the supply pipe 44 and the bore 43 to the interior of the plastic pipe 38. In the first instance the air supply line 52 communicates with the connection 50. The projecting portion 55 of this line 52 hereby keeps the valve 54 in the open position, so that air can flow from the line 52 into the air supply pipe 44. The air line 51 is not connected to the connection 49, so that the valve 53 is in the closed position (FIGURE 1). This situation remains unchanged during and immediately after the cutting of the plastic pipe 38. As soon as the severed pipe section 56, moving rapidly to the right, has passed the connection 53, so that this connection has become accessible, the air supply line 51 is connected to the connection 53, whereby the valve 53 is opened and air from the line 51 can flow into the supply pipe 44 (FIGURE 2).

As soon as the air line 51 has been connected to the air supply pipe 44, the air line 52 is uncoupled from the air pipe 44, so that the valve 54 closes immediately. At this moment the situation is as shown in FIGURE 3, wherein the air lines 51 and 52 have changed places with respect to their position as shown in FIGURE 1. The path to be followed by the pipe section 56 is now no longer obstructed so that this pipe section can be withdrawn over the connection 50. As soon as the pipe section 56 has entirely passed the connection 50, the air line 52 is again connected to the air supply pipe 44 in a manner as shown in FIGURE 2. As soon as the air line 52 has again been coupled to the air pipe 44 and air from the said line 52 is being supplied to the pipe 44, the air line 51 is disconnected from the air pipe 44 in a manner as shown in FIGURE 1. A new pipe section may now be slid beyond the connection 49 and over the centralizer 45, the steps shown in FIGURES 1–3 being subsequently repeated. When one or both of the air lines 51 and 52 are connected to the air pipe 44, these lines serve not only for the supply of air, but also for counteracting the forces exerted by the air pressure and friction on the air pipe 44 and the piston 41, so that the piston 41 and the air pipe 44 remain in the same place relative to the surroundings.

For the production of long to very long pipe lengths the apparatus may be considerably simplified as shown in FIGURE 7. In this case the air supply lines 51 and 52 and the air pipe 44, together with the centralizer 45 and the piston 41, may be replaced by a plug 61 provided with a bore 63. The plug 61 is tightly placed in the leading end of the plastic pipe 38 and the bore 63 is permanently connected to a flexible air supply line of approximately the same length as the length of the plastic pipe 38 to be produced. The flexible air supply line 62 is permanently connected to an air supply means 64. The plug 61 therefore travels with the plastic pipe 38 and may, after a pipe length has been cut off by a cutting device 42, be placed on the new leading end of pipe. Because production must be temporarily interrupted during cutting of the plastic pipe and displacement of the plug, this method is less efficient for the production of short pipe-lenths, but owing to its simplicity is very suitable for lengths of, for example, 100 meters or more.

We claim as our invention:

1. An apparatus for producing reinforced pipes, comprising in combination a device for moving a plastic tubular film, a closing means for locally closing the moving tubular film and a means located past said closing means for applying alternate layers of helically wound resin-impregnated reinforcing threads and axially oriented resin-impregnated reinforcing threads when the tubular film is supported by a filling gaseous medium, a fixedly mounted piston connected to an air-supply pipe and provided with a bore in communication with the air-supply pipe supplying air from this pipe into the tube, over which piston and air-supply pipe the pipe formed by the tube and the coating is able to pass during production.

2. An apparatus as in claim 1, wherein the air-supply pipe is provided with connections for disconnectably connecting an air-supply line, which connections are arranged on the air-supply pipe at a distance from each other greater than one length of the pipe to be produced.

3. An apparatus as in claim 2, wherein the connections on the air-supply pipe are provided with valves adapted to be opened by the air-supply lines to be connected to the connections to allow the passage of air from the air-supply lines to the air-supply pipe, but which valves close when the air-supply lines are removed as a result of which the escape of air from the air-supply pipe is prevented.

References Cited

UNITED STATES PATENTS

| | | | |
|---|---|---|---|
| 587,545 | 8/1897 | Cobb | 156—156 X |
| 1,913,327 | 6/1933 | Barnes | 156—149 |
| 3,049,762 | 8/1962 | Jackson | 156—149 |
| 3,068,134 | 12/1962 | Cilker et al. | 156—172 |
| 3,234,309 | 2/1966 | Graff | 264—95 |
| 3,159,183 | 12/1964 | Brumbach | 138—125 |
| 3,216,876 | 11/1965 | Tyhurst | 156—173 |

EARL M. BERGERT, *Primary Examiner.*

M. L. KATZ, *Assistant Examiner.*

U.S. Cl. X.R.

156—156, 172

Disclaimer 3,446,689.—*Frederik W. Storm van Leeuwen, Jan C. van Dijk,* and *Johan C. Hoogeveen,* Delf, Netherlands. APPARATUS FOR THE MANUFACTURE OF PLASTIC PIPES. Patent dated May 27, 1969. Disclaimer filed June 3, 1971, by the assignee, *Shell Oil Company.*

Hereby enters this disclaimer to claim 1 of said patent.

[*Official Gazette April 29, 1975.*]